Figure 1:
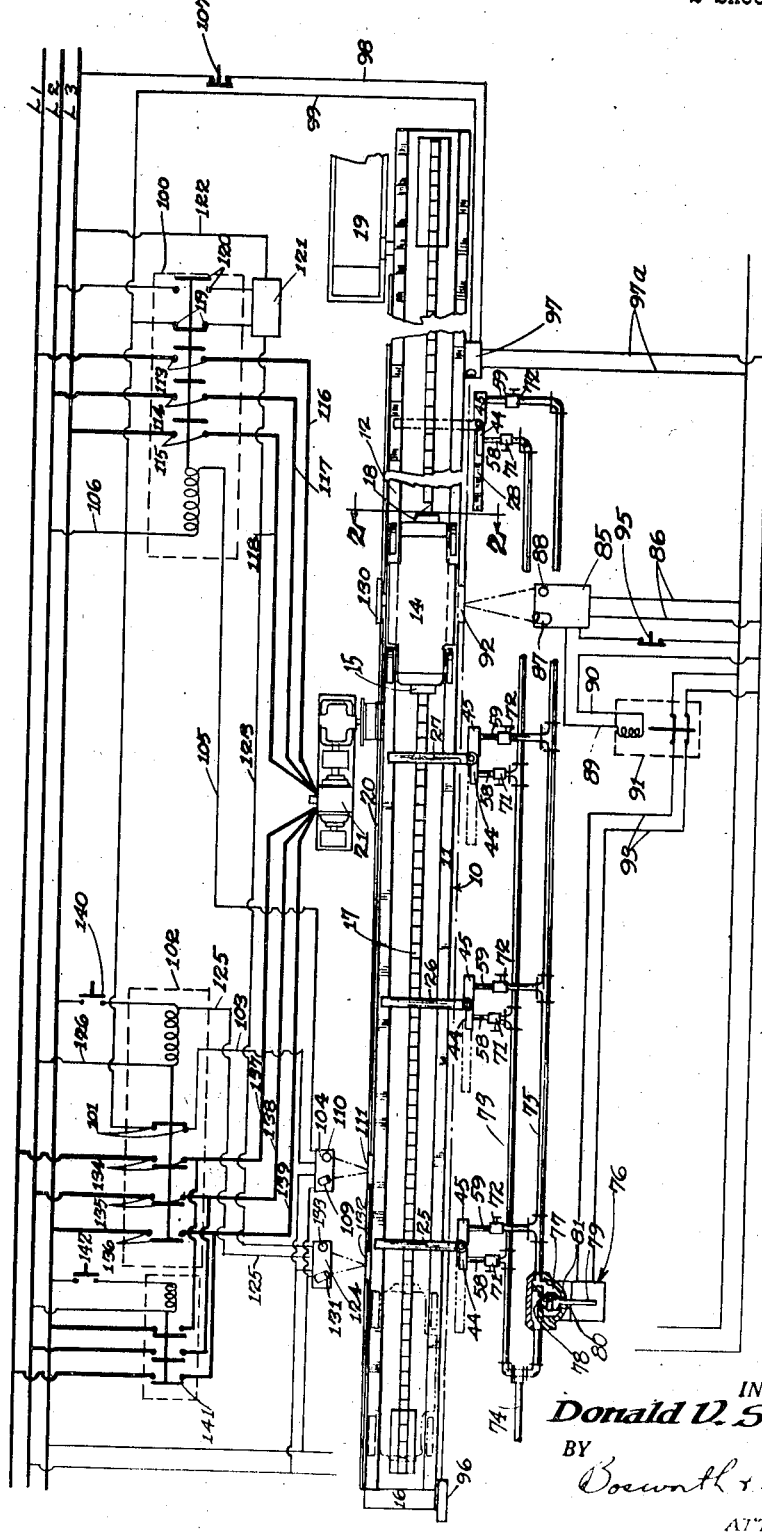

Aug. 3, 1948.    D. V. STROCK    2,446,438
DRAWBENCH

Filed Feb. 23, 1945    2 Sheets-Sheet 2

INVENTOR.
Donald V. Strock
BY
Bosworth & Sessions
ATTORNEY

Patented Aug. 3, 1948

2,446,438

UNITED STATES PATENT OFFICE 2,446,438

DRAWBENCH

Donald V. Strock, Youngstown, Ohio, assignor to The Aetna-Standard Engineering Company, Youngstown, Ohio, a corporation of Ohio Application February 23, 1945, Serial No. 579,337

15 Claims. (Cl. 205—3)

This invention relates to apparatus such as draw benches of the type employed for drawing tubes, bars and the like and more particularly to controls for such an apparatus. The drawbench illustrated and described herein is especially adapted to drawing tubes, but it is to be understood that the invention is also applicable to the drawing of bars and the like.

In a well known type of drawbench, the tubes are pulled through a die mounted in a die stand at one end of the bed of the drawbench by a carriage which is moved along the bed away from the die by a chain driven by the main drive motor. The carriage is provided with tongs for gripping the end of a tube and pulling it through the die and the arrangement is such that as the trailing end of the tube leaves the die, the other end of the tube is simultaneously released from the tongs on the carriage, thus permitting the tube to drop downwardly toward the bed of the bench. At the same time the carriage is released from the chain. After the drawing operation is completed, the carriage is returned to a position adjacent the die stand by a cable driven by a separate electric motor.

In order to catch the drawn tube after it is released from the die, skid or discharge arms are provided. These arms are spaced longitudinally along the bed and are mounted for movement between a discharging position in which they extend transversely across the bed to receive the tube and convey it to one side of the bench and an inactive position in which they extend parallel to the bench. The arms must be in proper position to receive the tube at the time it is released but at other times they must be swung out of the way to prevent the carriage from damaging arms as it moves back and forth along the bench.

In order to save time in operation of the drawbench it is desirable to return the carriage to the die stand as quickly as possible after the operation of drawing the tube is completed. Thus it is desirable to start the carriage on its return trip as soon as the tube is discharged and to operate the carriage return motor at relatively high speed throughout the greater portion of the travel of the carriage toward the die stand. Then the motor should be slowed down as the carriage nears the die stand and stopped with the carriage adjacent the die stand in position so that the carriage jaws can grasp the pointed end of a tube projecting through the die.

The invention relates to a control for the arms of a drawbench whereby the arms will be swung into position to receive the tube only after the carriage has passed each arm on its travel in the direction away from the die stand. The invention also comprises a control whereby the carriage cannot be started back toward the die stand until the arms are all moved to inactive position along side of the bench and out of the path of the carriage. The invention also relates to an automatic control means in which the desired sequence of operations is carried out rapidly by means of a control embodying photoelectric cells so that the operator has nothing to do but push the button, which swings the discharge arms to inactive position, the arrangement being that the carriage return motor will start at high speed as soon as the path of the carriage along the bed is clear and will stop if the path should be obstructed by one of the discharge arms or any other obstruction for any reason, the high speed operation being continued until the carriage approaches the die stand, when the carriage is automatically slowed down and finally stopped adjacent the die stand.

A general object of the present invention is the provision of a simple fool-proof control means for operating a drawbench in the manner described above. More specifically, an object of the invention is the provision of a control for the discharge arms of drawbenches whereby the arms are only swung across the bench after the carriage has completed its travel away from the die stand beyond the last arm required to support the tube. A further object is to provide an interconnection between the carriage return control and the discharge arm control whereby the carriage is started on its return trip as soon as the arms are swung out of the way.

Another object is the provision of a photoelectric control apparatus for controlling the discharge arms of drawbenches. Another object is the provision of a photoelectric control apparatus for preventing the operation of the carriage return motor of a drawbench until the discharge arms are completely out of the way of the return movement of the carriage. Another object is to provide automatic control for the carriage return of the drawbench whereby photoelectric means are provided for slowing down and stopping the drawbench as it approaches the die stand.

Another object is to provide controls for the discharge arms and carriage return mechanisms of a drawbench whereby the speed of operation of the drawbench can be increased. A further object is to provide controls for the discharge arms and carriage return of a drawbench wherein no latches, dogs or conventionally actuated limit switches are needed.

Another object is to provide a photo cell control for drawbenches which is arranged to be substantially fool proof, and to be safe in the event of any failure of either the electronic devices or the power source. Further objects and advantages of my invention will become apparent from the following description of a preferred form thereof, reference being made to the accompanying drawings. The essential characteristics are summarized in the claims.

Briefly a preferred form of my invention contemplates a drawbench in which the discharge arms are moved to and from their discharging position by means of air cylinders; an air cylinder of relatively small diameter functions to move the arms to discharge position extending across the bed of the bench, while an air cylinder of larger diameter moves the arms to their inactive position parallel to the bench. The two air cylinders are opposed to each other in their action; both are supplied from the same source of compressed air, and the flow of air to the larger cylinder is controlled by a solenoid actuated valve arranged to shut off the connection between the larger cylinder and the source of compressed air and permit the escape of air from the cylinder when it is desired to permit the arms to be swung across the drawbench by the action of the smaller cylinder. The solenoid valve in turn is controlled by a photo cell circuit arranged so that the solenoid valve is energized after the carriage has moved to a predetermined point in its travel away from the die stand, which point is beyond the last of the discharge arms required to receive the drawn tube and convey it to one side of the bench.

Another light source and photo cell combination, in which the light is projected longitudinally along the bench, is provided to control the return of the carriage to the die stand. The beam of light is projected so that it will be interrupted if any one of the discharge arms is extending across the drawbench in the path of the carriage and the circuits are arranged so that when the operator pushes a button to de-energize the solenoid controlling the solenoid valve then the larger cylinders in the discharge arm mechanism swing the arms to their position parallel to the bench and out of the way of the carriage. When all the arms have been swung to their inactive position the light beam extending along the bench is no longer obstructed and the photo cell relay operates to close the control circuit leading to the carriage return motor, automatically starting the carriage on its return trip. As the carriage approaches the die stand in its return movement it passes another photo cell and light projector unit and interrupts the beam between the light projector and the photo cell, thus actuating the slow down control of the carriage return motor. After the carriage has been slowed down it passes another photo cell unit which in a similar manner actuates the controls which stop the carriage return motor adjacent the die stand. The controls are inter-connected and arranged so as to be substantially fool proof and to make possible rapid action and increased production with the drawbench.

Figure 2:
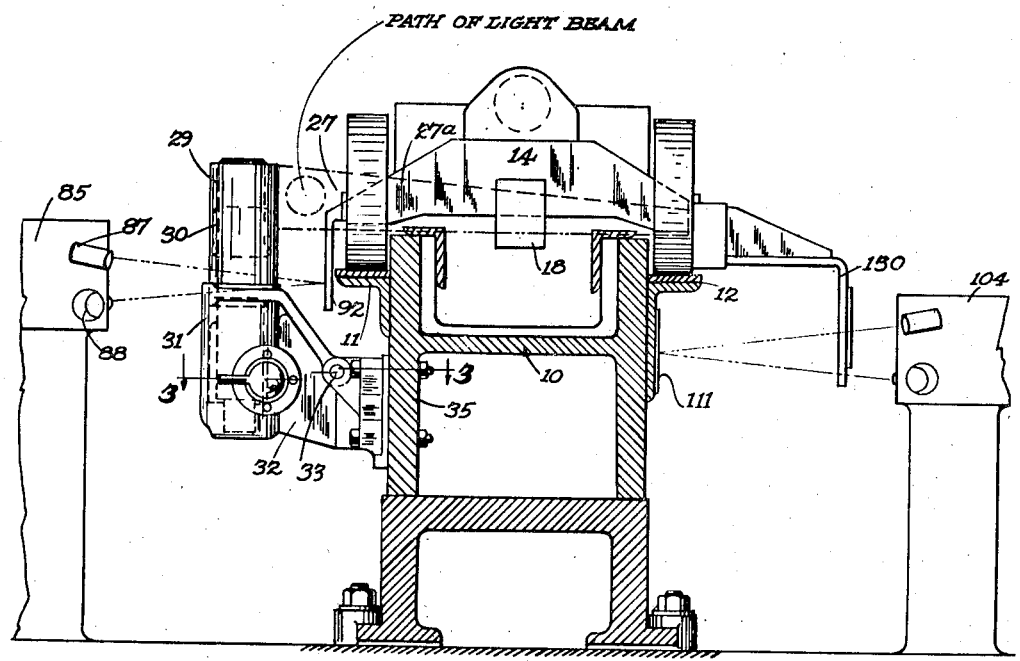
Figure 3:
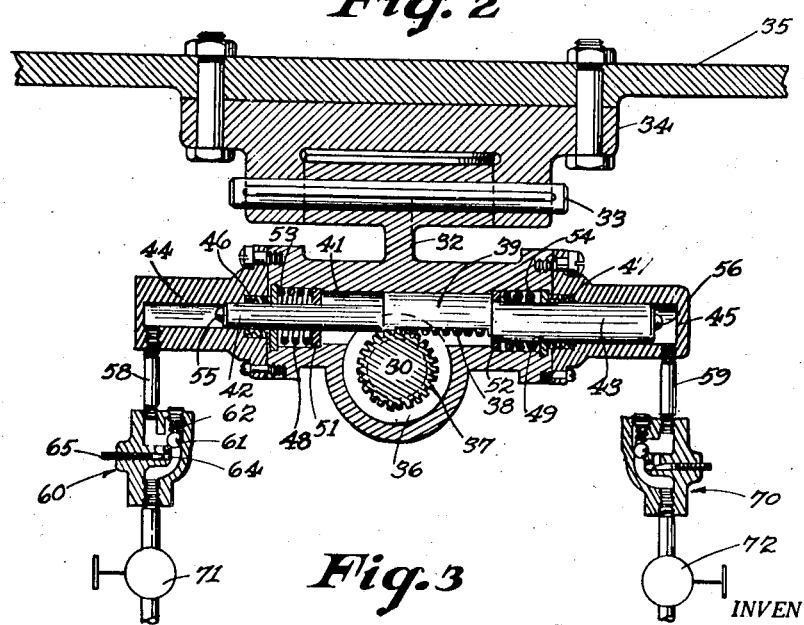

Referring to the drawings, Figure 1 is a somewhat diagrammatic plan view of a drawbench embodying my invention, including an elementary wiring diagram of the photoelectric control circuits and a piping diagram for the fluid actuated cylinders for moving the discharge or skid arms; Figure 2 is a transverse section through the bench shown in Figure 1, the section being indicated by line 2—2 of Figure 1; and Figure 3 is a horizontal sectional detail taken along the line 3—3 of Figure 2, showing the fluid pressure cylinder and piston arrangement for operating one of the discharge arms.

Considering first the mechanical construction of the apparatus, the drawbench may be of conventional type consisting of a bed indicated at 10 and having tracks 11 and 12 on which the carriage 14 runs. The carriage is provided with gripping tongs or jaws indicated at 15 which are adapted to grasp the pointed end of a tube and pull the tube through a die mounted in the die stand 16. The carriage is moved in a direction away from the die stand, to draw a tube through the die, by a chain 17 engaged by a hook 18 on the carriage and driven by conventional driving mechanism indicated in general at 19 and including a suitable main drive motor, reduction gearing and a sprocket.

In accordance with well known practice, the carriage is arranged so that when the trailing end of the tube drops out of the die at the conclusion of the drawing operation, the pointed end of the tube is simultaneously released from the jaws 15 of the carriage, and the hook 18 is disengaged from the chain 17, permitting the carriage to stop. After the drawing operation is completed, the carriage is returned to the die stand by means of a cable 20 driven by the carriage return motor 21 in the customary manner. The carriage return motor, in the present embodiment of the invention is a three phase A. C. motor, with separate windings for high speed and slow speed operations. All of the foregoing elements may be of well known or conventional construction and, per se, form no part of the present invention.

In order to receive the drawn tubes as they are disengaged from the die and the jaws 15 of the carriage, discharge or skid arms 25, 26, 27 and 28 spaced longitudinally along the bed 11 are provided. Preferably, these arms are pivoted for movement in a substantially horizontal plane between a discharging position wherein they extend across the bench, and an inactive position wherein they are disposed parallel to the bench and out of the path of the carriage in its movement along the bench. The arms 25, 26 and 27 are shown in full lines in discharging position across the bench and in broken lines in their inactive position parallel to the bench. The arm 28 is shown in inactive position. This movement of the discharge arms is necessary to provide an unobstructed path for the carriage along the bed of the bench.

Various mechanisms, such as the mechanism disclosed, for example, in the Rodder and Strock Patent No. 2,262,432, issued November 11, 1941, have been employed to control the movement of such discharge arms in drawbenches. While such mechanisms have been generally successful, nevertheless difficulties have been encountered in the operation of drawbenches embodying such discharge arm mechanisms in that latches, dogs, cams or the like disposed adjacent the discharge arm operating mechanism and engageable by a corresponding dog or cam on the carriage have been employed to control the movements of the arms. The blows struck by the carriage against these parts have on occasion broken them, resulting in failure of operation of the mechanism.

If the mechanism fails to operate, leaving the discharge arms in the path of the carriage, the result often is the destruction of the discharge arms.

According to a preferred form of the present invention, I eliminate all mechanical contact between the carriage and the discharge arm operating mechanism and thereby provide a construction which is not subject to the difficulties of prior arrangements. To this end I preferably construct the discharge arm operating mechanism as shown particularly in Figures 2 and 3. This mechanism is generally similar to that described in greater detail in the aforesaid Rodder and Strock Patent No. 2,262,432, but the mechanical latches and dogs employed in the mechanism of said patent are eliminated.

Inasmuch as the operating mechanisms for all of the arms are identical, only the mechanism for operating arm 27, will be described in detail. In Figure 2, the arm is shown in its discharging or active position extending across the drawbench. The arm is preferably provided with a sloping upper surface as indicated at 27a so that a tube falling thereon will roll off the bench to the right in the arrangement shown in Figure 2, although other means for removing the tubes from the arms may be employed if desired. At its left hand end the arm is provided with a hub portion 29 mounted on a vertical shaft 30. The shaft 30 is mounted for rotation in the housing 31 which is supported by a bracket 32 pivotally mounted on a rod 33 which is in turn carried by a bracket 34 secured to the vertical member 35 of the bed 10. The housing 31 is provided with an enlarged internal chamber as indicated at 36 in which the lower part of the shaft 30 is disposed. This portion of the shaft is provided with gear teeth 37 which engage the rack teeth 38 formed in the central portion of the plunger 39 which is slideably mounted in the central tubular portion 41 of the housing 31. Thus movement of the plunger 39 will cause corresponding rotation of the shaft 30. As shown in Figure 3, a small piston or plunger 42 extends from the left hand end of the plunger 39 and a large piston or plunger 43 extends from its right hand end. Cylinders 44 and 45 within which the pistons 42 and 43 operate are secured to opposite ends of the tubular portion 41 of the housing 31. Suitable packing rings 46 and 47 form the desired seal between the pistons and the cylinders, and cushioning springs 48 and 49 may be provided in enlarged recesses at the ends of the tubular portion 41. The washers 51 and 52 have sliding movement in the housings, and the springs 48 and 49 abut against washers 53 and 54 at their outer ends. To additionally cushion the operation of the plungers within the cylinder, rubber bumpers 55 and 56 may be secured to the ends of the pistons as shown.

Fluid under pressure may be supplied to the smaller cylinder 44 and the larger cylinder 45 by conduits 58 and 59, respectively. Inasmuch as the larger cylinder has about twice the area of the smaller cylinder, it will be evident that if equal fluid pressures are supplied to both cylinders, the plungers will be urged to the left in the arrangement shown in the drawing, moving the discharge arm to a position parallel with the bed of the drawbench. If the pressure in the larger cylinder is reduced to atmospheric, for example, while a higher pressure is maintained in the smaller cylinder, then the arm will be moved to its discharge position across the drawbench. The control mechanism and piping arrangements to be described below are arranged to control the admission of fluid under pressure to the larger cylinder and thus to control the movement of the discharge arm.

The conduit 58 is provided with a needle check valve 60, including a ball check 61, urged against its seat by a spring 62 and a by-pass passage 64 controlled by the needle valve 65. By this arrangement, which is also described in the aforesaid Rodder and Strock patent, fluid under pressure may be admitted rapidly to the cylinder 44, but if desired, the outflow of fluid may be restricted by means of the needle valve 65. This arrangement provides means for further controlling the speed of movement of the discharge arm, a similar valve 70 being incorporated in the conduit 59 leading to the larger cylinder 45. Both conduits embody manually operable shut-off valves 71 and 72, respectively, by means of which the arm operating mechanism can be rendered inactive in the event it should be desired to maintain the arm stationary in its inactive position, for example, as is the case with arm 28 shown in Figure 1. There are no latches, dogs or the like in the preferred embodiment of the arm mechanism, the position of the arm being controlled solely by the fluid pressures in the cylinders.

Referring now to Figure 1, the conduits leading to the smaller cylinders of the actuating mechanisms for the arms 25, 26 and 28 are also indicated at 58, and the conduits leading to the larger cylinders for these mechanisms are also indicated by reference character 59. The shut-off valves for the conduits are indicated by reference characters 71 and 72 as described above. Each of the conduits 58 and 59 are preferably provided with needle check valves 60 and 70, but these have been omitted from Figure 1 for convenience in illustration. As shown in Figure 1, the conduits 58 are all connected to a single longitudinally extending conduit 73 which leads to a supply pipe 74 connected to a source of fluid under pressure such as compressed air. The conduits 59 are similarly connected to a longitudinally extending conduit 75 which also leads to the supply pipe 74. Thus both cylinders of each discharge mechanism are preferably actuated from the same source of fluid pressure.

In order to control the movement of the discharge arms, a solenoid valve indicated diagrammatically at 76 is interposed in the conduit 75 between its connection with the pipe 74 and the first branch conduit 59. This valve is arranged to admit fluid under pressure to the main portion of conduit 75 and the branch conduits 59 in one position, and in its other position to shut off the main portion of conduit 75 from the source of fluid pressure and permit escape of fluid under pressure from the larger cylinders through the conduits 59 and the conduit 75. The valve is diagrammatically illustrated in the drawing as comprising a valve member 77 which in the position shown is seated on the seat 78 to shut off communication with the conduit 74. The valve stem 79 projects through an opening 80 in the valve housing so that in the position shown, compressed air can escape from the conduit 75 and associated conduits 59 until pressure within the larger cylinders is reduced substantially to atmospheric. In its other position, the valve member 77 seats on the seat 81 surrounding the opening 80, thus shutting off communication to atmosphere from the conduit 75 while opening communication between the conduit 75 and the main portion of conduit 74. The position of the valve member 77 is controlled through the stem 79 by a solenoid which is arranged so that when the solenoid is energized, the valve takes the position shown in the drawing, cutting off air pressure from the conduit 75, reducing the air pressure in the larger cylinders, and thus permitting the pressure in the smaller cylinders to move the plungers 39 to the right, rotating the shafts 36 of each mechanism in a clockwise direction and bringing the discharge arms to their discharging position across the bench as shown in the drawings.

In Figure 1 of the drawing, arm 28 has not been moved to discharging position, the valves 71 and 72 leading to the mechanism, for this arm being closed to render the arm inactive. Four discharge arms are shown in Figure 1. Obviously a greater or lesser number of discharge arms may be employed, depending upon the requirements of the drawbench. As tubes of various lengths may be drawn on the same bench, and as it is desirable to stop the carriage as soon as the drawing operation has been completed, there may be times when it is not necessary to utilize all of the arms on a particular bench. Such a situation is shown in the drawing wherein the length of tube is such that the arms 25, 26 and 27 are sufficient to support it, whereas the arm 28 is not needed, and therefore has been rendered inactive. Hereafter in the description and in the claims wherein reference is made to swinging all of the arms of the drawbench simultaneously across the bed, it is to be understood that the term "all" does not necessarily mean all of the arms with which the bench is equipped, but means only so many of the arms as may be required to support the drawn tube.

It will be noted that with this arrangement, so long as fluid under pressure is supplied to both cylinders, the arms will occupy their inactive position parallel to the bench and out of the way of the carriage 14. Fluid under pressure will be admitted to both cylinders of each unit as long as the solenoid valve is deenergized. Thus, any failure in the electrical supply leading to the solenoid valve will either maintain the arms in their inactive position or cause them to move to inactive position if the failure should occur while they are in discharging position. Thus the device is a "fail safe" apparatus, for no damage can occur to the arms or carriage so long as the arms are out of the path of the carriage. Furthermore, if something should interrupt the supply of air under pressure to the cylinders, the arms could not be moved into discharging position, for the pressure would be reduced in both the large and small cylinders as they are connected to the same source, and the arms would remain stationary in their inactive position; or if the failure should occur while the arms were in discharging position, the release in pressure in the smaller cylinders would permit the arms to be swung out of the way manually or pushed readily out of the way if engaged by the carriage, minimizing the chances for damage to either carriage or arm.

The electrical circuits for controlling the operation of the solenoid valve and thus the position of the discharge arms, and for controlling the return movement of the carriage will now be described. As noted above, according to the desired sequence of operations, the discharge arms are swung across the bench immediately after the carriage has passed the last arm that is required to support a drawn tube, then the tube drops onto the arms and is conveyed off of the bench by them. Next the arms are swung to their inactive position; the carriage is then started at high speed on its return to the die stand, is automatically slowed down as it approaches the die stand and stopped adjacent the die stand. These operations are controlled by the circuits shown in elementary fashion in Figure 1, well known or conventional circuit elements being omitted for convenience in illustration.

In the position shown in Figure 1, the carriage has completed its movement in the drawing direction and the discharge arms have been swung across the bench to receive a drawn tube (not shown) as it drops from the die and the jaws 15. The positioning of the discharge arms 25, 26 and 27 across the bench is accomplished through the photo cell relay unit indicated generally at 85, to which current is supplied from a suitable source through conductors 86. The unit includes a light source 87 and a photoelectric cell 88, together with the customary electronic devices, relays and the like (not shown) to enable the unit to control the current flowing in conductors 89 and 90 leading to the magnetic contactor 91. The unit is arranged so that the circuit in conductors 89 and 90 is open except when light from the light source 87 strikes the photo cell 88. This occurs when the carriage 14 is in position opposite the unit 85, the light from the light source 87 being reflected to the photocell 88 by the mirror 92 mounted on the side of the carriage as shown particularly in Figure 2. The unit may be moved to different positions along the bench so that its position will correspond to the length of the tubing being drawn. For convenience of illustration, the light source 87 and photo cell 88 are shown as lying in the same horizontal plane in Figure 1, the path of light being indicated by broken lines. In actual practice, it is somewhat preferable to mount the light source and photo cell in the same vertical plane as shown in Figure 2. This is also true of the slow down and stop photo cell units which will be described below.

When the carriage, in its travel away from the die stand, reaches the position shown, the light beam from light source 87 strikes photo cell 88, resulting in the closing of the circuit to magnetic contactor 91. Energizing this contactor completes the circuit through conductors 93 from the control current supply to the solenoid valve 76. Energization of the solenoid valve, as described above, results in cutting off the larger cylinders 45 of the discharge arm mechanisms from the source of fluid under pressure and opening them to atmosphere, thus permitting the smaller cylinders 44 to move the arms across the bench to the position shown.

It will be understood that the photo cell unit 85 incorporates suitable holding circuits, sequence relays and the like to insure that the contactor 91 will remain energized even though the mirror should move on beyond the path of the light beam from the source 87 and to prevent false operation of the contactor 91; for example, to prevent operation if the carriage should pass the beam of light on its return trip toward the die stand.

It will be noted that the arms cannot be swung across the bench unless the contactor 91 is energized, and this cannot occur unless light strikes the photo cell 88. Thus failure of the power source, the light source or the photocell cannot result in movement of the arms into the path of the carriage.

After the tube has been drawn and conveyed off of the bench by the discharge arms, the next step in the operation of the bench is to return the carriage to the die stand as quickly as possible in order to start another drawing operation without waste of time. This is preferably accomplished through a series of automatic interconnected controls so that the operator only has to push a single button in order to move the arms to inactive position out of the way of the carriage and start the carriage at high speed on its return trip, the slow down and stopping of the carriage at the die stand also being automatically accomplished.

This sequence of operations is initiated by the operator opening the circuit including the conductors 89 and 90 which control the magnetic contactor 91. This may be accomplished as by the push button 95 or through other suitable controls. The push button opens the circuit permitting the magnetic contactor 91 to drop out, de-energizing the solenoid valve 76 and thereby admitting fluid under pressure to the conduit 75 and the large cylinders of the arm actuating mechanisms which then overpower the small cylinders, swinging the arms into their inactive position alongside the bench as shown in dotted lines in Figure 1.

As soon as the arms have been swung into inactive position, the carriage is automatically started on its return trip by a photoelectric cell control including a light source 96 disposed adjacent the die stand of the carriage and projecting a beam of light longitudinally along the bench toward the photo cell unit 97. The photo cell unit 97 is energized from the control current supply through conductors 97a and is provided with suitable electronic devices, relays and the like arranged to complete the circuit between conductors 98 and 99. These conductors connect lines $L_2$ and $L_3$ of the main three phase A. C. source indicated at $L_1$, $L_2$ and $L_3$ to the coil of the magnetic contactor 100 which controls the high speed operation of the carriage return motor; the circuit including auxiliary contacts 101 of the magnetic contactor 102 which controls the slow speed operation of the motor, conductor 103, slow down photo cell unit 104, and conductors 105 and 106. An emergency stop button 107 may be included in the circuit if desired.

Thus when the arms are moved to their inactive position so that they no longer obstruct the light beam (the path of the light beam with relation to one of the discharge arms is shown in broken lines in Figure 2) from the light source 96 to the photo cell 97, then the photo cell unit 97 is activated and so far as unit 97 is concerned, the circuit to the coil of contactor 100 is closed.

However, the control of the contactor 100 is not solely in the unit 97, for the circuit through slow down control photo cell unit 104 must also be closed. The circuit through this unit, which contains a light source 109, photo cell 110 and suitable electronic devices, relays and the like, is closed so long as light from the source 109 is reflected by the mirror 111 to the photo cell 110. Thus, when there is no obstruction between light source 109, mirror 111 and photo cell 110, and when the contactor 102 is de-energized so that the auxiliary contacts 101 are closed, the circuit from lines $L_2$ and $L_3$ to the contactor 100 will be closed, resulting in the closing of the circuits through contacts 113, 114, 115, leading to conductors 116, 117 and 118 which connect the power lines $L_1$, $L_2$ and $L_3$ with the high speed winding of the carriage return motor 21, thereby starting the carriage on its return trip at high speed.

At the same time, the energization of the contactor 100 opens the circuit through the normally closed auxiliary contacts 119 and closes the circuit through auxiliary contacts 120, which control the sequence relay 121, which is in the circuit made up of conductors 122 and 123, the stop control photo cell unit 124, conductor 125, the coil magnetic contactor 102 and conductor 126. The sequence relay prevents this circuit from being closed when the parts are in the position shown, i.e., before the carriage has started on its return to the die stand, but permits the closing of the circuit after high speed contactor 100 has been operated once and then de-energized by the interruption of the light beam to the photo cell 110 of the slow down control 104. Thus the carriage return motor can be automatically operated at slow speed only after it has operated at high speed and only if the arms are off the bench.

The slow speed operation normally takes place as the carriage approaches the die stand, when the flag 130 composed of any opaque, non-reflective material, and mounted on the carriage as shown best in Figure 2, interrupts the beam from light source 109, thus opening the circuit in the unit 104, de-energizing the contactor 100 and cutting off the high speed winding of the carriage return motor. At the same time, the circuit through the auxiliary contacts 119 and sequence relay 121 is closed, which results in the energization of the magnetic contactor 102 if the light beam from the light source 96 to the photo cell unit 97 is unobstructed and if the light beam from the light source 131 of the stop control photo cell unit 118 is unobstructed so that it is reflected by the mirror 132, mounted on the bed of the drawbench, back to the photo cell 133. Under these conditions, the circuits through contacts 134, 135 and 136 are closed, permitting current to flow from the main power lines $L_1$, $L_2$ and $L_3$ through conductors 137, 138 and 139 to the slow speed winding of the carriage return motor. At the same time, auxiliary contacts 101 are opened, providing an interlock to prevent the simultaneous operation of both high and low speed contactors. Thus as the carriage passes the slow down photo cell unit 104, the high speed winding of the motor is cut out. The carriage then proceeds slowly toward the die stand until the light beam from the source 131 is interrupted by flag 130, causing the circuit through the unit 124 to be opened and permitting the contactor 102 to drop out, stopping the carriage return motor so that the carriage will coast to a position adjacent the die stand as indicated in broken lines in Figure 1; the distances between the slow down unit 104 and the stop control unit 124, and between the stop control unit 124 and the die stand are correlated with the speed and mass of the carriage, the carriage brake etc., to stop the carriage in the proper position.

As in the case of unit 85, the various photo cell units may include appropriate interconnections, sequence control relays, and the like in order to prevent false operation of the various controls. The automatic controls described herein may be supplemented by manual starting, stopping and inching controls for the carriage return motor, such as the emergency stop control 107 previously described, the forward inching control obtained through push button 140, and the reverse inching control provided by the reverse contactor 141 controlled by push button 142.

It will be noted that the apparatus throughout has "fail safe" characteristics, for the failure or interruption of any light source or the failure of any circuit or electronic device will result in the stopping of the carriage rather than in its operation. Also, the failure of the source of fluid pressure cannot result in damage to the arm mechanism. The controls are relatively simple, increase the speed of operation of the bench and are arranged to be substantially foolproof.

While it is preferable to employ the complete system of controls described herein, those skilled in the art will appreciate that one or more of the several elements of complete system may be employed without the others. For example, the arm operating mechanism control may be utilized without the carriage return starting control and vice versa. The carriage return slow down control may be used by itself or in combination with one or more of the other elements. Other combinations of elements may also be selected. Discharge arm operating mechanisms other than the preferred form disclosed herein may also be employed. Various other changes may be made without departing from the spirit and scope of my invention. Therefore, it is to be understood that my patent is not limited to the preferred form of the invention described in the foregoing specification, or in any manner other than by the appended claims when given the range of equivalents to which my patent may be entitled.

I claim:

1. In a drawbench having a bed, a die stand, a carriage operable on the bed, means for moving the carriage along the bed in drawing direction, means for returning the carriage to the die stand after a drawing operation has been completed, a series of discharge arms spaced longitudinally along the bench and movable into and out of discharging position transversely across the bed and means for moving said arms into and out of discharging position; means for controlling said arm moving means to move said arms into discharging position across the bench only after said carriage has passed said arms in its movement away from the die stand, means for controlling said arm moving means to move said arms out of discharging position and out of the path of said carriage, photoelectric means for starting the operation of said carriage return means as soon as all of said discharge arms are out of the path of said carriage, and means including photoelectric means activated by the carriage as it approaches the die stand for automatically controlling the carriage return means whereby the carriage return means is operated to return the carriage at high speed until the carriage approaches the die stand, thereafter to move the carriage at slow speed, and finally to stop the carriage adjacent the die stand.

2. In a drawbench having a bed, a die stand, a carriage operable on the bed, means for moving the carriage along the bed in drawing direction, means for returning the carriage to the die stand after a drawing operation has been completed; a series of discharge arms spaced longitudinally along the bench and movable into and out of discharging position transversely across the bed and means for moving said arms into and out of discharging position; photoelectric means activated by said carriage for controlling said arm moving means to move said arms into discharging position across the bench only after said carriage has passed said arms in its movement away from the die stand, means for controlling said arm moving means to move said arms out of discharging position and out of the path of said carriage, photoelectric means for starting the operation of said carriage return means as soon as all of said discharge arms are out of the path of said carriage, and means including photoelectric means activated by the carriage as it approaches the die stand for automatically controlling the carriage return means whereby the carriage return means is operated to return the carriage at high speed until the carriage approaches the die stand, thereafter to move the carriage at slow speed, and finally to stop the carriage adjacent the die stand.

3. In a drawbench having a bed, a die stand, a carriage operable on the bed, means for moving the carriage along the bed in drawing direction, means for returning the carriage to the die stand after a drawing operation has been completed, a series of discharge arms spaced longitudinally along the bench and movable into and out of discharging position transversely across the bed and means for moving said arms into and out of discharging position; means for controlling said arm moving means to move said arms out of discharging position and out of the path of said carriage, photoelectric means for preventing the operation of said carriage return means until all of said discharge arms are out of the path of said carriage, and means including photoelectric means activated by the carriage as it approaches the die stand for automatically controlling the carriage return means to stop the carriage adjacent the die stand.

4. In a drawbench having a bed, a die stand and a carriage operable on the bed, a series of discharge arms spaced longitudinally along the bed and pivoted for swinging movement into and out of discharging position transversely across the bed, means for moving said arms into discharging position, and photoelectric means activated by the position of said carriage on said bed for controlling said arm moving means to prevent movement of any one of said arms to discharge position until said carriage, in its travel along said bench away from the die stand, has passed said arm.

5. In a drawbench having a bed, a die stand and a carriage operable on the bed, a series of discharge arms spaced longitudinally along the bed and pivoted for swinging movement into and out of discharging position transversely across the bed, means for moving said arms into discharging position, and photoelectric means comprising a light source, a photoelectric relay and a mirror mounted on said carriage whereby light from said light source is reflected by said mirror to said photoelectric cell when said carriage reaches a predetermined position for controlling said arm moving means to prevent movement of any one of said arms to discharge position until said carriage, in its travel along said bench away from the die stand, has passed said arm.

6. In a drawbench having a bed, a die stand, and a carriage operable on the bed, a series of discharge arms spaced longitudinally along the bed and movable into and out of discharging position transversely across the bed, means for moving said arms into discharging position, and photoelectric means activated by the position of said carriage on said bed for controlling said arm moving means to move said arms simultaneously into discharging position across the bench only after said carriage has passed said arms in its movement away from the die stand.

7. In a drawbench having a bed, a die stand, a carriage operable on the bed, means for moving the carriage along the bed in drawing direction and means for returning the carriage to the die stand after a drawing operation has been completed; a series of discharge arms spaced longitudinally along the bed and movable into and out of discharging position transversely across the bed, means for moving said arms into discharging position, photoelectric means activated by the position of said carriage on said bed for controlling said arm moving means to move said arms into discharging position across the bench only after said carriage has passed said arms in its movement away from the die stand, and photoelectric means including a light source at one end of the bed projecting a beam along the bed which is in a position to be obstructed by any one of said arms when in discharging position but which is unobstructed when all said arms are out of the path of movement of said carriage and a photoelectric cell at the other end of the bed, for preventing the operation of said carriage return means as long as any of said discharge arms is across the bed.

8. In a drawbench having a bed, a die stand, a carriage operable along the bed and a discharge arm adapted to receive tubes drawn on said bench, said discharge arm being pivoted for movement between an inactive position wherein it is out of the path of the carriage and discharging position wherein it extends across said bench; means for moving said arm from one said position to the other comprising a fluid actuated device constantly connected to a source of fluid pressure and tending to move said arm out of inactive position into discharging position, a second fluid actuated device, adapted to be connected to the same source of fluid pressure and exerting a force tending to move said arm out of discharging position and into inactive position, said second fluid actuated device exerting a greater force on said arm than the first device whereby said arm is retained in or moved to inactive position when said second fluid actuated device is connected to said source of fluid pressure, a solenoid valve controlling the connection between said second fluid actuated device and said source of fluid pressure, said solenoid valve connecting said second fluid actuated device to said source when de-energized and shutting off communication between said source and said second fluid actuated device and permitting discharge of fluid from said second fluid actuated device when energized, whereby said arm will be disposed in discharging position when said valve is energized and in inactive position when said valve is de-energized, and photo cell relay means adapted to be activated by said carriage after it has passed said arm in its movement away from said die stand for energizing said solenoid valve.

9. In a drawbench having a bed, a die stand, a carriage operable along the bed and a discharge arm adapted to receive tubes drawn on said bench, said discharge arm being pivoted for movement between an inactive position wherein it is out of the path of the carriage and discharging position wherein it extends across said bench; means for moving said arm from one said position to the other comprising a fluid actuated device constantly connected to a source of fluid pressure and tending to move said arm out of inactive position into discharging position, a second fluid actuated device, adapted to be connected to the same source of fluid pressure and exerting a force tending to move said arm out of discharging position and into inactive position, said second fluid actuated device exerting a greater force on said arm than the first device whereby said arm is retained in or moved to inactive position when said second fluid actuated device is connected to said source of fluid pressure, a valve adapted in one position to connect said second fluid actuated device and said source of fluid pressure, and in another position to release the pressure in said second fluid actuated device and means controlled by said carriage for causing said valve to release the pressure from said second fluid actuated device to permit said first fluid actuated device to sway said arm into discharging position after said carriage has passed said arm.

10. In a drawbench having a bed, a die stand, a carriage operable along the bed and a discharge arm adapted to receive tubes drawn on said bench, said discharge arm being pivoted for movement between an inactive position wherein it is out of the path of the carriage and discharging position wherein it extends across said bench; means for moving said arm from one said position to the other comprising a fluid actuated device constantly connected to a source of fluid pressure and tending to move said arm in one direction, a second fluid actuated device, adapted to be connected to the same source of fluid pressure and exerting a force tending to move said arm in the opposite direction, said second fluid actuated device exerting a greater force on said arm than the first fluid actuated device, and a valve controlling the connections between the said second fluid actuated device and said source of fluid pressure and adapted in one position to connect said second fluid actuated device to said source of fluid pressure and in another position to release the pressure in said second fluid actuated device, whereby said valve controls the position of said arm, and means controlled by movement of said carriage for controlling said valve.

11. In a drawbench having a bed, a die stand, a carriage operable along the bed, means for returning said carriage to said die stand and a discharge arm adapted to receive tubes drawn on said bench, said discharge arm being pivoted for movement between an inactive position wherein it is out of the path of the carriage and discharging position wherein it extends across said bench; means for moving said arm from one said position to the other comprising a fluid actuated device constantly connected to a source of fluid pressure and tending to move said arm out of inactive position into discharging position, a second fluid actuated device, adapted to be connected to the same source of fluid pressure and exerting a force tending to move said arm out of discharging position and into inactive position, said second fluid actuated device exerting a greater force on said arm than the first device whereby said arm is retained in or moved to inactive position when said second fluid actuated device is connected to said source of fluid pressure, a solenoid valve controlling the connections between said second fluid actuated device and said source of fluid pressure, said solenoid valve connecting said second fluid actuated device to said source when de-energized, and shutting off communication between said source and said second fluid actuated device and permitting discharge of fluid from said second fluid actuated device when energized, whereby said arm will be disposed in discharging position when said valve is energized and in inactive position when said valve is de-energized, photoelectric means adapted to be activated by said carriage after it has passed said arm in its movement away from said die stand for energizing said solenoid valve to cause said arm to move to discharging position, manually controlled means for de-energizing said valve to cause said arm to be moved to inactive position, and photoelectric means permitting said carriage return means to start only after said arm is moved to inactive position.

12. In a drawbench having a bed, a die stand, a carriage operable on the bed, means for moving the carriage along the bed in drawing direction means for returning the carriage to the die stand after a drawing operation has been completed and a series of discharge arms spaced longitudinally along the bench and movable into and out of discharging position transversely across the bed, and means for moving said arms into and out of discharging position; photoelectric means activated by the position of said carriage on said bed for controlling said arm moving means to move said arms into discharging position across the bench only after said carriage has passed said arms, photoelectric means including a light source at one end of the bench and a photoelectric cell at the other end of the bench for starting said carriage return means as soon as all said arms are out of the path of the carriage and for stopping the carriage return whenever any discharge arm is in discharging position across the bench, two photoelectric units each including a light source and photo cell mounted in longitudinally spaced positions along side the bed near the die stand and a mirror mounted on the bed whereby light from said light source is normally reflected from said mirror to said photo cell, means mounted on said carriage for preventing light from reaching said photo cell as the carriage passes each said unit, and circuits whereby the carriage return means is slowed down as the carriage passes the first said unit and stopped as it passes the second said unit in its return travel toward the die stand.

13. In a drawbench having a bed, a die stand, a carriage operable on the bed, means for moving the carriage along the bed in drawing direction, means for returning the carriage to the die stand after a drawing operation has been completed, a series of discharge arms spaced longitudinally along the bench and movable into and out of discharging position transversely across the bed, and fluid pressure actuated means for moving said arms into and out of discharging position, and photoelectric means activated by the position of said carriage on said bed for controlling the fluid pressure supply to said arm moving means to cause said arm moving means to move said arms into discharging position across the bench only after said carriage has passed said arms, photoelectric means including a light source at one end of the bench and a photoelectric cell at the other end of the bench for preventing the operation of said carriage return means as long as any of said discharge arms are in discharging position across the bench, two photoelectric units each including a light source and photo cell mounted in longitudinally spaced positions alongside the bed near the die stand and a mirror mounted on the bed whereby light from said light source is normally reflected from said mirror to said photo cell, means mounted on said carriage for preventing light from reaching said photo cell as the carriage passes each said unit, and circuits whereby the carriage return means is slowed down as the carriage passes the first said unit and stopped as it passes the second said unit in its return travel toward the die stand.

14. In a drawbench having a bed, a die stand, a carriage operable on the bed, means for moving the carriage along the bed in drawing direction and means for returning the carriage to the die stand after a drawing operation has been completed; photoelectric means for starting said carriage return means at high speed, two photoelectric units mounted in longitudinally spaced positions alongside the bed near the die stand and adapted to be activated by the carriage passing thereby on its return to the die stand and circuits whereby the carriage return means is slowed down as the carriage passes the first said unit and stopped as it passes the second said unit in its return travel toward the die stand.

15. In a drawbench having a bed, a die stand, a carriage operable on the bed, means for moving the carriage along the bed in drawing direction and means for returning the carriage to the die stand after a drawing operation has been completed; means for starting said carriage return means at high speed, two photoelectric units each including a light source and photo cell mounted in longitudinally spaced positions alongside the bed near the die stand and a mirror mounted on the bed whereby light from said light source is normally reflected from said mirror to said photo cell, means mounted on said carriage for preventing light from reaching said photo cell as the carriage passes each said unit, and circuits whereby the carriage return means is slowed down as the carriage passes the first said unit and stopped as it passes the second said unit in its return travel toward the die stand.

DONALD V. STROCK.

REFERENCES CITED

The following references are of record in the file of this patent:

UNITED STATES PATENTS

| Number | Name | Date |
|---|---|---|
| 2,182,902 | Nye | Dec. 12, 1939 |
| 2,262,432 | Rodder | Nov. 11, 1941 |
| 2,301,674 | Andrews | Nov. 10, 1942 |
| 2,331,953 | Andrews | Oct. 19, 1943 |
| 2,369,467 | Kerr | Feb. 13, 1945 |